(12) United States Patent
Omiya

(10) Patent No.: US 8,824,660 B2
(45) Date of Patent: *Sep. 2, 2014

(54) HISTORY MANAGEMENT APPARATUS, HISTORY MANAGEMENT METHOD AND HISTORY MANAGEMENT PROGRAM

(71) Applicant: P&W Solutions Co., Ltd., Tokyo (JP)

(72) Inventor: Toshiyuki Omiya, Tokyo (JP)

(73) Assignee: P&W Solutions Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/967,216

(22) Filed: Aug. 14, 2013

(65) Prior Publication Data

US 2014/0050313 A1 Feb. 20, 2014

(30) Foreign Application Priority Data

Aug. 17, 2012 (JP) .................................. 2012-180962

(51) Int. Cl.
*H04M 3/00* (2006.01)
*H04M 5/00* (2006.01)
*H04M 3/51* (2006.01)

(52) U.S. Cl.
CPC .................................. *H04M 3/5175* (2013.01)
USPC ............. 379/265.06; 379/265.03; 379/265.07

(58) Field of Classification Search
CPC .................................................. H04M 3/5175
USPC ............. 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1
See application file for complete search history.

(56) References Cited

U.S. PATENT DOCUMENTS

| | | | | |
|---|---|---|---|---|
| 2002/0001379 | A1* | 1/2002 | Matsumoto | 379/265.09 |
| 2002/0051530 | A1* | 5/2002 | Sato et al. | 379/265.01 |
| 2002/0176564 | A1* | 11/2002 | Saito et al. | 379/265.01 |
| 2007/0206772 | A1* | 9/2007 | Sato et al. | 379/265.02 |
| 2008/0043988 | A1* | 2/2008 | Galvin | 379/265.11 |
| 2009/0122973 | A1* | 5/2009 | Jay et al. | 379/266.01 |
| 2010/0158237 | A1* | 6/2010 | McCormack et al. | 379/265.06 |
| 2014/0050312 | A1 | 2/2014 | Omiya | |

FOREIGN PATENT DOCUMENTS

JP 2012-044569 A 3/2012

OTHER PUBLICATIONS

USPTO, Non-Final Rejection for U.S. Appl. No. 13/967,173, Mail Date Apr. 3, 2014.

* cited by examiner

*Primary Examiner* — Khai N Nguyen
(74) *Attorney, Agent, or Firm* — SoCal IP Law Group LLP; Steven C. Sereboff; John E. Gunther

(57) ABSTRACT

A history management apparatus includes: an acquisition part that acquires a fragment data set indicating an action of a switchboard to a call, and an execution time of the action; a history generation part that generates a historical data set indicating a history of response states of an agent to one call, from a plurality of fragment data sets acquired; an extraction part that extracts a historical data set satisfying predetermined conditions, respectively, among the historical data sets; an image generation part that generates data of a display image displaying information specifying a call corresponding to the historical data set extracted, along with information indicating the predetermined conditions; and a display control part that causes the display image to be displayed on a display unit.

7 Claims, 7 Drawing Sheets

FIG. 2

| DATE | TIME | ACTION | INCOMING NUMBER | OUTGOING NUMBER | AGENT |
|---|---|---|---|---|---|
| 2012.08.01 | 10:21:11 | INCOMING | 090xxxxxxxx | | |
| 2012.08.01 | 10:21:23 | INCOMING | 080xxxxxxxx | | |
| 2012.08.01 | 10:21:35 | OP ANSWER | 090xxxxxxxx | | aaaa |
| 2012.08.01 | 10:21:36 | RESPONSE | 090xxxxxxxx | | aaaa |
| 2012.08.01 | 10:21:40 | HOLD START | 090xxxxxxxx | | aaaa |
| 2012.08.01 | 10:21:42 | OP ANSWER | 080xxxxxxxx | | bbbb |
| 2012.08.01 | 10:21:45 | RESPONSE | 080xxxxxxxx | | bbbb |
| 2012.08.01 | 10:21:51 | HOLD END | 090xxxxxxxx | | aaaa |
| 2012.08.01 | 10:21:58 | TRANSFER START | 090xxxxxxxx | 1112 | aaaa |
| ... | ... | ... | ... | ... | ... |

FIG. 3

| CALL | No | DATE | TIME | ACTION | INCOMING NUMBER | OUTGOING NUMBER | AGENT |
|---|---|---|---|---|---|---|---|
| 00001 | 01 | 2012.08.01 | 10:21:11 | INCOMING | 090xxxxxxxx | | aaaa |
| 00001 | 02 | 2012.08.01 | 10:21:35 | OP ANSWER | 090xxxxxxxx | | aaaa |
| 00001 | 03 | 2012.08.01 | 10:21:36 | RESPONSE | 090xxxxxxxx | | aaaa |
| 00001 | 04 | 2012.08.01 | 10:21:40 | HOLD START | 090xxxxxxxx | | aaaa |
| 00001 | 05 | 2012.08.01 | 10:21:51 | HOLD END | 090xxxxxxxx | | aaaa |
| 00001 | 06 | 2012.08.01 | 10:21:58 | TRANSFER START | 090xxxxxxxx | 1112 | aaaa |
| ... | ... | ... | ... | ... | ... | ... | ... |
| 00002 | 01 | 2012.08.01 | 10:21:23 | INCOMING | 080xxxxxxxx | | bbbb |
| 00002 | 02 | 2012.08.01 | 10:21:42 | OP ANSWER | 080xxxxxxxx | | bbbb |
| 00002 | 03 | 2012.08.01 | 10:21:45 | RESPONSE | 080xxxxxxxx | | bbbb |
| ... | ... | ... | ... | ... | ... | ... | ... |

FIG. 4

| QUEUE | WAITING TIME | INCOMING TIME | START TIME | END TIME | CALL DURATION | HOLD TIME | NUMBER OF TIMES | TRANSFER DESTINATION | POST-PROCESSING | AGENT | NOTES |
|---|---|---|---|---|---|---|---|---|---|---|---|
| REGISTRATION CHANGE | 00:53 | 09:50:08 | 09:51:01 | 09:56:23 | 05:22 | 00:00 | 0 | 1001 | 01:32 | H.SHIMIZU | NORMAL |
| POINT SERVICE | 00:04 | 09:51:02 | 09:51:06 | 09:53:15 | 02:09 | 00:00 | 0 | 1002 | 00:52 | K.TODA | VIP |
| REVOLVING | 00:08 | 10:22:08 | 10:22:16 | 10:26:41 | 02:53 | 01:32 | 1 | 1003 | 01:37 | K.NAKATA | NORMAL |
| NEW ENROLLMENT | 00:12 | 10:28:11 | 10:28:23 | 10:38:06 | 08:38 | 01:05 | 1 | 1012 | 01:41 | S.NAKAMURA | 2nd TRANSFER |
| LOSS THEFT | 01:04 | 10:53:57 | 10:55:01 | 11:04:06 | 07:14 | 01:51 | 2 | 1101 | 02:22 | D.OKU | NORMAL |
| DOCUMENT REQUEST | 01:11 | 11:01:54 | 11:02:05 | 11:16:54 | 13:38 | 01:11 | 1 | 1051 | 01:11 | S.ONO | 2nd INCOMING |
| ID PASSWORD CHANGE | 01:04 | 10:56:04 | 10:56:08 | 11:00:54 | 04:46 | 00:00 | 0 | 1025 | 02:10 | Y.KAZAMA | NORMAL |
| SMALL LOAN | 01:12 | 11:21:54 | 11:22:06 | 11:28:24 | 04:47 | 01:31 | 2 | 1251 | 02:50 | S.KIKUHARA | COMPLAINER |
| GOLD | 00:07 | 11:26:54 | 11:27:01 | 11:39:41 | 11:49 | 00:51 | 1 | 1011 | 00:42 | H.NANAMI | NORMAL |
| TROUBLE INQUIRY | 01:03 | 11:22:59 | 11:24:02 | 11:42:06 | 16:19 | 01:45 | 2 | 1421 | 00:47 | T.FUJITA | 2nd HOLDING |
|  | 00:09 | 11:40:06 | 11:40:15 | 11:51:58 | 11:43 | 00:00 | 0 | 1051 | 01:22 | D.MATSUI | NORMAL |

HISTORY MANAGEMENT APPARATUS, HISTORY MANAGEMENT METHOD AND HISTORY MANAGEMENT PROGRAM

This application is based on and claims the benefit of priority from Japanese Patent Application No. 2012-180962, filed on 17 Aug. 2012, the content of which is incorporated herein by reference.

BACKGROUND OF THE INVENTION

1. Field of the Invention

The present invention relates to an apparatus, method and program for history management of actions on a telephone switchboard.

2. Related Art

Conventionally, in a contact center, each action such as connection, hold and transfer of a line has been executed based on an incoming call from a client or an outgoing call from an agent by way of PBX (Private Branch eXchange) or CTI (Computer Telephony Integration).

In addition, it has been proposed to manage as statistical information by correlating these actions with an agent who is the source of the operation (for example, refer to Japanese Unexamined Patent Application, Publication No. 2012-044569).

SUMMARY OF THE INVENTION

However, PBX or CTI records or outputs individual actions as a fragment of a response at a certain moment in the contact center. In addition, since the operational history of an agent is accumulated as statistical information also by the technology of Japanese Unexamined Patent Application, Publication No. 2012-044569, these fragments are not associated, and it has been difficult to understand the sequence of response history relative to one incoming call or outgoing call.

For this reason, it has been difficult for the manager of a contact center to find a case requiring attention in response contents by the agent.

The present invention has an object of providing a history management apparatus, history management method and history management program that allow for a call requiring attention to be easily found.

The present invention provides the following such solution.

According to a first aspect, a history management apparatus includes: an acquisition part that acquires a fragment data set indicating an action of a switchboard to a call, and an execution time of the action; a history generation part that generates a historical data set indicating a history of response states of an agent to one call, from a plurality of fragment data sets acquired by the acquisition part; an extraction part that extracts a historical data set satisfying predetermined conditions, respectively, among the historical data sets; an image generation part that generates data of a display image displaying information specifying a call corresponding to the historical data set extracted by the extraction part, along with information indicating the predetermined conditions; and a display control part that causes the display image to be displayed on a display unit.

According to such a configuration, the history management apparatus generates historical data indicating response history of an agent relative to one call, from a plurality of fragment data sets. Then, since the history management apparatus can display by specifying a call for which this historical data satisfies a predetermined condition, the operator of the history management apparatus can easily find a call requiring attention. As a result thereof, an improvement in the response quality of an agent is achieved.

According to a second aspect, in the history management apparatus as described in the first aspect, the predetermined condition includes at least one among being a call specified by a predetermined telephone number, being a call from the same telephone number in a predetermined time period for a multiple time, being a call for which transfer has been carried out a plurality of times, and being a call for which holding has been carried out a plurality of times.

According to such a configuration, the predetermined condition includes at least one among being a call specified by an established number, being a call from the same telephone number in a predetermined time period for a multiple number of times, being a call for which transfer has been carried out a plurality of times, and being a call for which holding has been carried out a plurality of times. Therefore, for example, VIP, second time transfer, second time incoming telephone call, complainer, second time holding, etc. is specified, and the operator of the history management apparatus can easily find a call requiring attention. As a result thereof, an improvement in the response quality of an agent is achieved.

According to a third aspect, in the history management apparatus as described in the first or second aspect, the historical data set includes a duration and number of times of the response states, respectively, and the image generation part generates data of a display image further displaying the historical data set along with information specifying the call.

According to such a configuration, the historical data includes the duration or number of times of response states, respectively. Therefore, the operator of the history management apparatus can easily understand the response time from incoming response to disconnect, hold time and number of times, transfer number of times, etc. as indices of response quality, for example, and easily inspect and analyze whether the response to a call requiring attention was appropriate. As a result thereof, an improvement in the response quality of an agent is achieved.

According to a fourth aspect, in the history management apparatus as described in the third aspect, the image generation part generates data of a display image displaying the historical data set extracted by the extraction part in a display mode that differs from other historical data sets, when list displaying the historical data set of each of a plurality of calls.

According to such a configuration, the history management apparatus list displays the historical data set of a specific call requiring attention in a display mode different from other historical data sets. Therefore, the operator of the history management apparatus can easily find a call requiring attention. As a result thereof, an improvement in the response quality of an agent is achieved.

According to a fifth aspect, in the history management apparatus as described in the first or second aspect, the image generation part generates data of a display image displaying a seating chart of a plurality of agents, and displaying information indicating the predetermined condition, by associating with a seat of an agent corresponding to the historical data set extracted by the extraction part, among historical data sets related to currently ongoing calls.

According to such a configuration, the history management apparatus performs display of information indicating a predetermined condition by associating with the seat of an agent corresponding to specific historical data requiring attention, among historical data related to calls current continuing, as well as displaying a seating chart of a plurality of agents. Therefore, the operator of the history management apparatus can easily find a call requiring attention. As a result thereof, an improvement in the response quality of an agent is achieved.

According to a sixth aspect, in a history management method executed by a computer, the method includes the steps of: acquiring a fragment data set indicating an action of a switchboard to a call, and an execution time of the action; generating a historical data set indicating a history of response states of an agent to one call, from a plurality of fragment data sets acquired in the acquiring step; extracting a historical data set satisfying predetermined conditions, respectively, among the historical data sets; generating data of a display image displaying information specifying a call corresponding to the historical data set extracted in the extracting step, along with information indicating the predetermined conditions; and displaying the display image on a display unit.

According to such a configuration, the same effects as the first aspect can be expected by a computer executing the history management method.

According to a seventh aspect, a history management program enables a computer to execute the steps of: acquiring a fragment data set indicating an action of a switchboard to a call, and an execution time of the action; generating a historical data set indicating a history of response states of an agent to one call, from a plurality of fragment data sets acquired in the acquiring step; extracting a historical data set satisfying predetermined conditions, respectively, among the historical data sets; generating data of a display image displaying information specifying a call corresponding to the historical data set extracted in the extracting step, along with information indicating the predetermined conditions; and displaying the display image on a display unit.

According to such a configuration, the same effects as the first aspect can be expected by having a computer execute the history management program.

According to the present invention, it is possible to easily find a call requiring attention.

BRIEF DESCRIPTION OF THE DRAWINGS

FIG. 2 is a view showing an example of fragment data according to the embodiment;

FIG. 3 is a view showing a portion of historical data according to the embodiment;

FIG. 4 is a view showing an example of a first screen according to the embodiment;

DETAILED DESCRIPTION OF THE INVENTION

Hereinafter, an embodiment of the present invention will be explained.

A history management apparatus 1 according to the present embodiment manages the history of response states of an agent relative to one call (incoming call or outgoing call) in a contact center, and performs display control for allowing a manager to find a call requiring attention.

Figure 1:
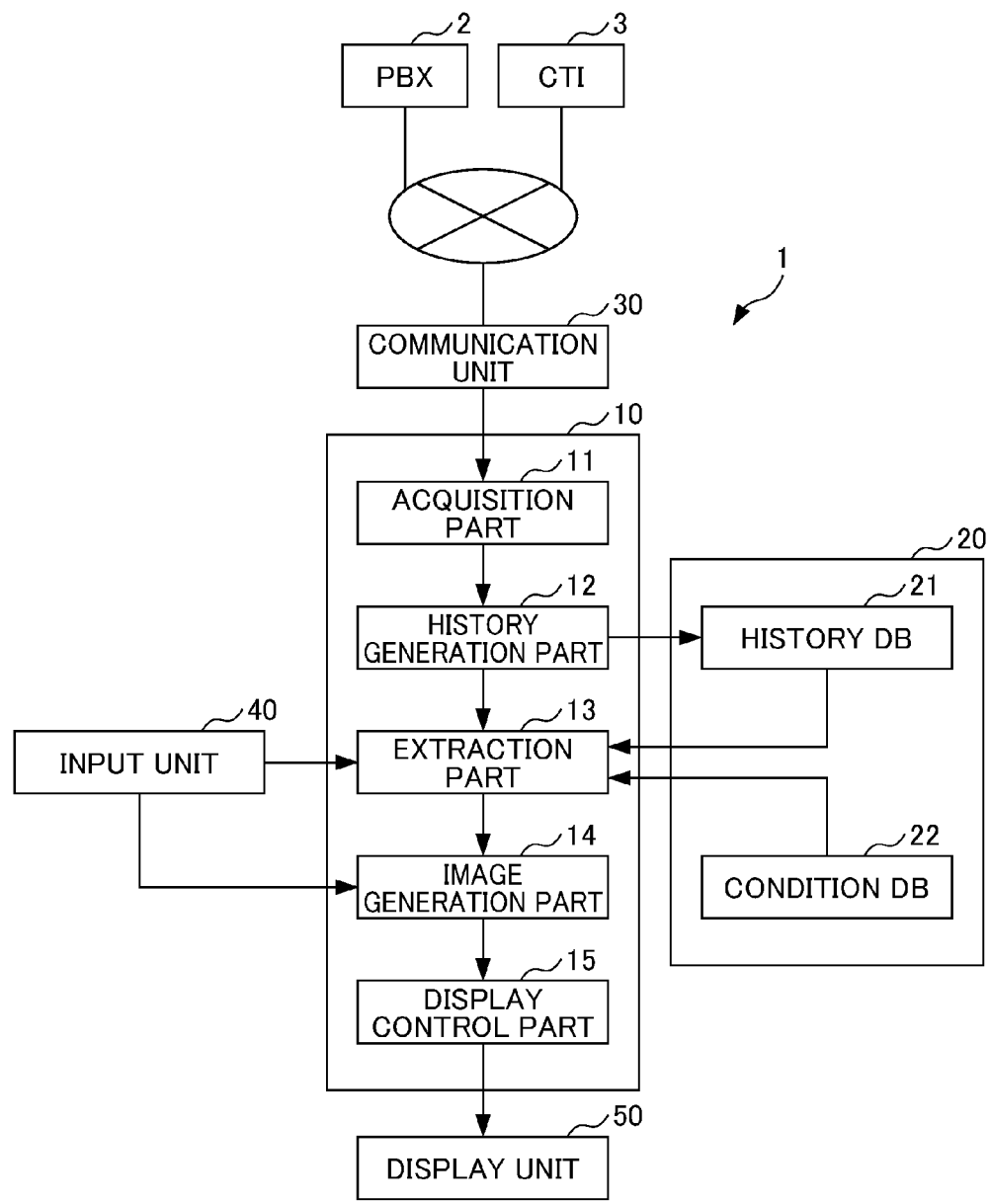
FIG. 1 is a block diagram showing a functional configuration of a history management apparatus according to an embodiment.

FIG. 1 is a block diagram showing a functional configuration of the history management apparatus 1 according to the present embodiment.

The history management apparatus 1 includes a control unit 10, storage unit 20, communication unit 30, input unit 40 and display unit 50. In addition, the history management apparatus 1 is connected with PBX 2 and CTI 3 via a predetermined network.

The control unit 10 is a portion controlling the history management apparatus 1 overall, and cooperates with the above-mentioned hardware to realize various functions of the present embodiment, by reading and executing various programs stored in the storage unit 20 as appropriate. The control unit 10 may be a CPU (Central Processing Unit). It should be noted that the functions of each part included in the control unit 10 will be described later.

The storage unit 20 is a storage area of various programs for causing hardware groups to function as the history management apparatus 1, various data, etc., and may be a HDD (Hard Disk Drive), flash memory, or the like. More specifically, a program to be executed in the control unit 10 for realizing the various functions of the present embodiment (history management program) is stored in the storage unit 20.

In addition, the storage unit 20 includes a history DB 21 that stores historical data (described later) generated by the control unit 10, and a condition DB 22 that stores conditional data (described later) for extracting specific historical data.

The communication unit 30 is a network adaptor for a case of the history management apparatus 1 sending and receiving data with another apparatus. The communication unit 30 performs data communication with PBX 2 or CTI 3 via the network.

The input unit 40 is an interface accepting the command inputs from an operator, i.e. manager of a contact center, to the history management apparatus 1. The input unit 40 is configured from a keyboard, mouse, touch panel, or the like, for example.

The display unit 50 is a display device that displays to the operator a screen for accepting the input of data, and displays a screen of processing results by the history management apparatus 1, according to the control of the control unit 10. The display unit 50 may be a display device such as a CRT (Cathode-Ray Tube) display device, LCD (Liquid Crystal Display) device, or the like.

Next, functions of the control unit 10 will be described in detail.

The control unit 10 includes an acquisition part 11, history generation part 12, extraction part 13, image generation part 14 and display control part 15. These respective parts are functional blocks realized by the control unit 10 executing the history management program.

The acquisition part 11 acquires, via the communication unit 30 from PBX 2 or CTI 3, fragment data indicating an action of PBX 2 to a call and the execution time of this action.

The fragment data acquired is data indicating the action performed by PBX 2 or CTI 3 at a certain moment, and a mutual association between a plurality of fragment data sets is not made. More specifically, in the case of there being a plurality of incoming consecutively to one line of the contact center, for example, the fragment data acquired in time series from PBX 2 or CTI 3 is not grouped in a unit of incoming, and the data relating to the plurality of incoming is mixed.

FIG. 2 is a view showing an example of fragment data according to the present embodiment.

In this example, the action of PBX 2, incoming number, calling number, and response handling agent are outputted relative to the data and time. In these fragment data sets acquired in time series, the fragment data related to a call received from an incoming number "090xxxxxxxx" and the fragment data related to a call received from an incoming number "080xxxxxxxx" are mixed.

The history generation part 12 generates historical data showing the history of response states of an agent relative to one call, from the plurality of fragment data sets acquired by the acquisition part 11.

Since history such as the duration and the number of times of each response state, which vary depending on actions of a series relative to one call, are not included in the fragment data sets of FIG. 2, the history generation part 12 first sorts the fragment data sets according to the incoming number.

FIG. 3 is a view showing a part of historical data generated by the history generation part 12 according to the present embodiment.

In this example, the history generation part 12 extracts a series of fragment data related to one call starting from incoming, and groups according to identification data and sequence number (No) of the call.

Furthermore, the history generation part 12 calculates the duration, number of times, etc. of each response state, which vary depending on the series of actions, respectively, based on the fragment data sets grouped, and stores as a part of the historical data along with the identification data of the call.

For example, the time from "incoming" until "operator (OP) answer" is stored as "waiting time". In addition, the total of the times from "hold start" until "hold end" is stored with the number of times as "hold time". Moreover, in the time from "response" until "disconnect" or "transfer end", the time excluding "hold time" is stored as "call duration". Additionally, the number of times of "transfer start" is stored.

Furthermore, in a case of an agent performing post-processing such as recording relating to a call after talking, this post-processing time is accumulated in CTI 3. This post-processing time is stored as a part of historical data by the history generation part 12, after acquired as fragment data by the acquisition part 11.

The extraction part 13 reads conditional data from the condition DB 22, and extracts historical data satisfying each of the conditions from the history DB 21.

The conditional data stored in the condition DB 22 includes the following five types.

a) VIP: A call specified by a telephone number set in advance. This specific telephone number may be stored in the condition DB 22, or may be acquired from CTI 3, etc.

b) Second time transfer: Transfer performed multiple times (e.g., two times) for one call.

c) Second time incoming telephone call: A call of a multiple time (e.g., second time) from the same telephone number within a predetermined time period.

d) Complainer: A call from the same telephone number incoming at least a predetermined number of times within a predetermined time period.

e) Second time holding: holding carried out multiple times (e.g., two times) for one call.

In addition, the extraction part 13 accepts the input of a criterion, and after searching historical data satisfying this criterion, may further extract specific historical data according to the above-mentioned condition.

FIG. 4 is a view showing an example of a first screen displayed on the display unit 50 according to the present embodiment.

In this example, a queue selection field 61 indicating a work section in the contact center, a range input field for a response start time or response end time (selection button 62 for response start or response end, time input field 63, selection button 64 for before or after, and range input field 65), incoming number selection field 66, and agent selection field 67 are provided as input means of search criteria. The extraction part 13 extracts historical data satisfying the conditions, when any of these search criteria are designated, and the search button 68 is pressed. It should be noted that a receive button 70 will be described later.

The image generation part 14 generates data of a display image displaying information specifying a call corresponding to historical data extracted by the extraction part 13, as well as information indicating the above-mentioned conditions a to e (VIP, second time transfer, second time incoming telephone call, complainer, second time holding).

The display control part 15 causes the display image generated by the image generation part 14 to be displayed on the display unit 50.

More specifically, the image generation part 14 generates data of an image to be displayed in a list display field 69 in the first screen example shown in FIG. 4, for example.

In this example, among the historical data related to one or more calls, respectively, the waiting time that is the time from incoming until response, the incoming time, the response start time, the response end time, the call duration, the hold time and number of times holding, transfer destination, post-processing time, and initially responding agent are list displayed.

Furthermore, a notes field 69a is provided for each historical data set. The notes field 69a displays the matter of being a specific historical data set satisfying the above-mentioned conditions, compared with normal historical data sets.

At this time, the specific historical data set is preferably a display mode differing from the normal historical data sets. For example, the notes field 69a is color coded for each of the conditions a to e, and the historical data is also emphasized similarly by a color coded border.

It should be noted that the list display field 69 may display historical data during a current response, in addition to the historical data for responses that have already finished.

Herein, the display contents of the list display field 69 are updated as appropriate in response to a predetermined operation on the input unit 40 by the operator of the history management apparatus 1, i.e. manager of the contact center.

For example, by operating the input unit 40, the manager selects a predetermined one item among the respective items of "waiting time" to "notes" in the list display field 69, and can make a designation to sort the selected item in ascending order or descending order individually.

In this case, the image generation part 14 sorts the item selected by the manager in ascending order or descending order according to this designation, and generates data of an image in which the list display field 69 has been updated based on the results of this sorting.

In this way, for example, the manager can refine the calls (talking) having a short response time as well handled calls (talking). Then, the manager can enact training of other agents by showing the other agents the well handled calls as handling serving as a model (including talking contents).

Conversely, the manager can refine calls (talking) with long response time as poorly handled talking, for example. Then, the manager inspects the contents of the poorly handled call, and can enact training of agents including the agent who responded to this call, based on the results of this inspection.

In addition, for example, by operating the input unit 40, the manager can input a phone number (incoming number) of a client that had a complaint in the incoming number selection field 66 as a criterion, and search by pressing the search button 68.

In this case, the extraction part 13 accepts the input of this search criterion, and extracts historical data satisfying this search criterion. The image generation part 14 generates data of an image in which the list display field 69 has been updated, based on the historical data extracted by the extraction part 13.

In this way, a manager can easily specify the complaint talking and the agent who handled this complaint talking. In other words, the manager can easily make refinement of the past calls (talking) of clients having complaints, refinement of the handling agents on this occasion, etc. Since the manager can thereby easily confirm the talking contents and specify the cause bringing about the complaint, it becomes possible to enact prevention of future complaint occurrences.

In addition, for example, by operating the input unit 40, the manager can input desired times, etc. into the range input field of response start time or response end time (selection button 62 for response start or response end, time input field 63, selection button 64 of before or after, and range input field 65) as the search criterion, and search by pressing the search button 68.

In this case, the extraction part 13 accepts the input of this search criterion, and extracts historical data satisfying this search criterion. The image generation part 14 generates data of an image in which the list display field 69 has been updated, based on the historical data extracted by the extraction part 13.

In this way, the manager can easily designate a desired time slot, using the search criteria of a variation like the response start time and end time, as well as how many minutes before or how many minutes after these times. More specifically, for example, in the case of a specific call (talking) that is the search target existing, even without knowing the exact time of the start time or end time of the response of this specific call, the manager can input an approximate time as the start time or end time, and easily search for this specific call by simply inputting the search criteria like setting until around a few minutes thereof as the search range.

In addition, for example, by operating the input unit 40 and pressing the receive button 70, the manager can select a desired one as a search criterion among incoming and outgoing as well as unanswered disconnect of the contact center as display targets of the list display field 69.

In this case, the extraction part 13 accepts the input of this search criterion, and extracts historical data satisfying this search criterion. The image generation part 14 generates data of an image in which the list display field 69 has been updated, based on the historical data extracted by the extraction part 13.

Herein, when unanswered disconnect is selected, for example, the extraction part 13 can extract (refine) historical data related to unanswered disconnect for which conventional confirmation has been difficult, from the log of PBX 2 or CTI 3 (fragment data). Therefore, the manager can easily confirm the number of received cases disconnected prior to connecting to an agent, time waiting until disconnection, etc., by viewing the list display field 69 based on this historical data. Then, based on the confirmed information, the manager can enact an improvement such that the contact center becomes a center that efficiently connects from the viewpoint of the client, by reassessing the settings of IVR (Interactive Voice Response) and reassessing the number of agents.

Figure 5:
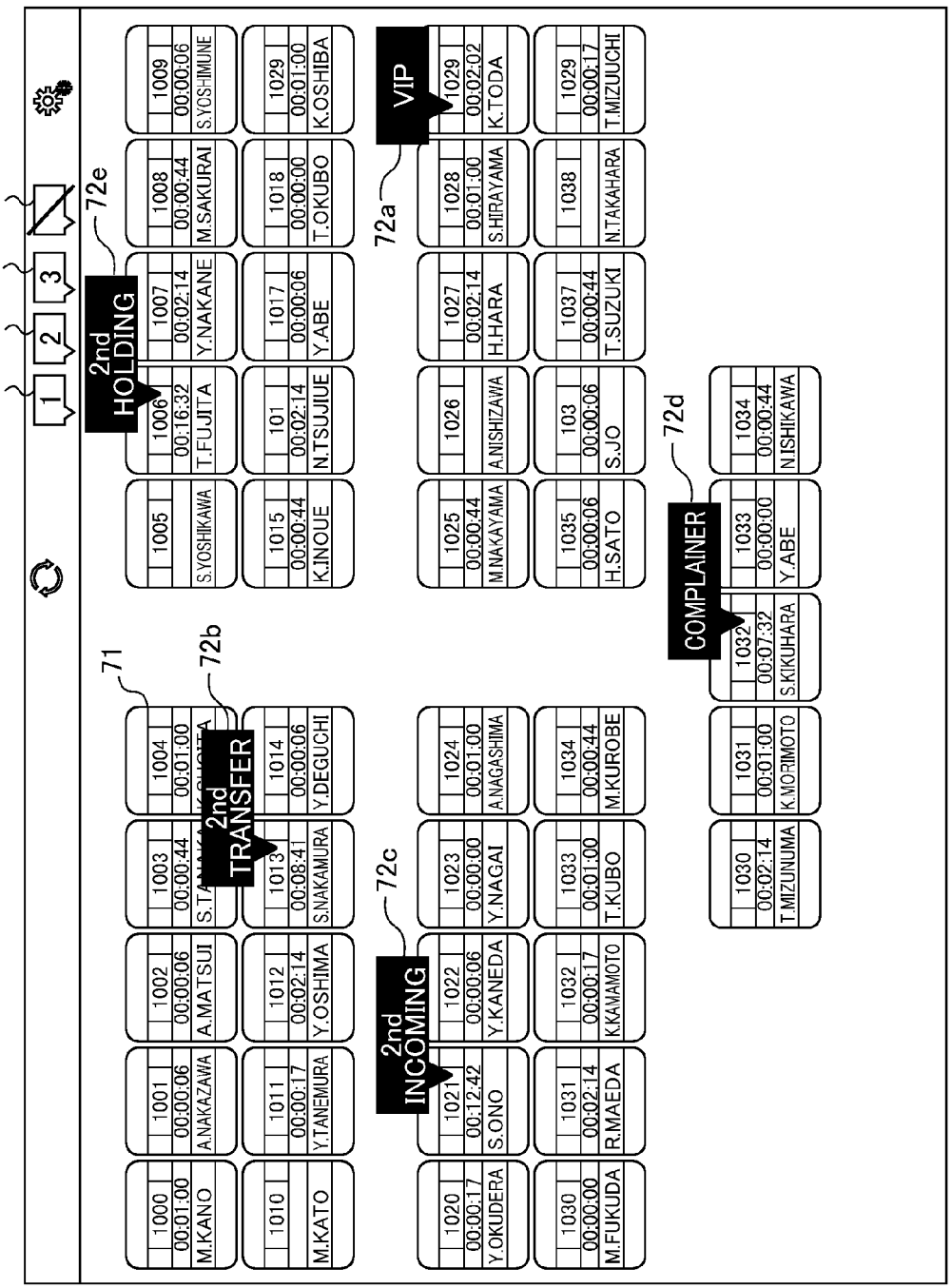
FIG. 5 is a view showing a first example of a second screen according to the embodiment.

FIG. 5 is a view showing an example of the second screen displayed on the display unit 50 according to the present embodiment.

The image generation part 14 generates data of a display image displaying a seating chart of a plurality of agents, along with displaying information indicating the conditions a to e, by associating with the seat of an agent corresponding to the specific historical data set extracted by the extraction part 13, among the historical data sets related to currently ongoing calls.

More specifically, seat images 71 showing the seats of each of the agents are displayed on the second screen. In addition to the name and extension number of an agent, the elapsed time since response start is displayed on the seat image 71.

Then, among the agents during a response, comments 72*a* to 72*e* similar to the notes field 69*a* of the first screen (FIG. 4) are displayed to be associated with the seat image 71 of the agent corresponding to the historical data set specified according to the conditions a to e.

It should be noted that, although the comments 72 represent the situation of the call during current talking, they may be displayed relative to an agent for which there is response history satisfying the condition in a past predetermined time period.

In addition, display switch buttons 73 to 75 and a display clear button 76 are arranged on the second screen.

Figure 6:
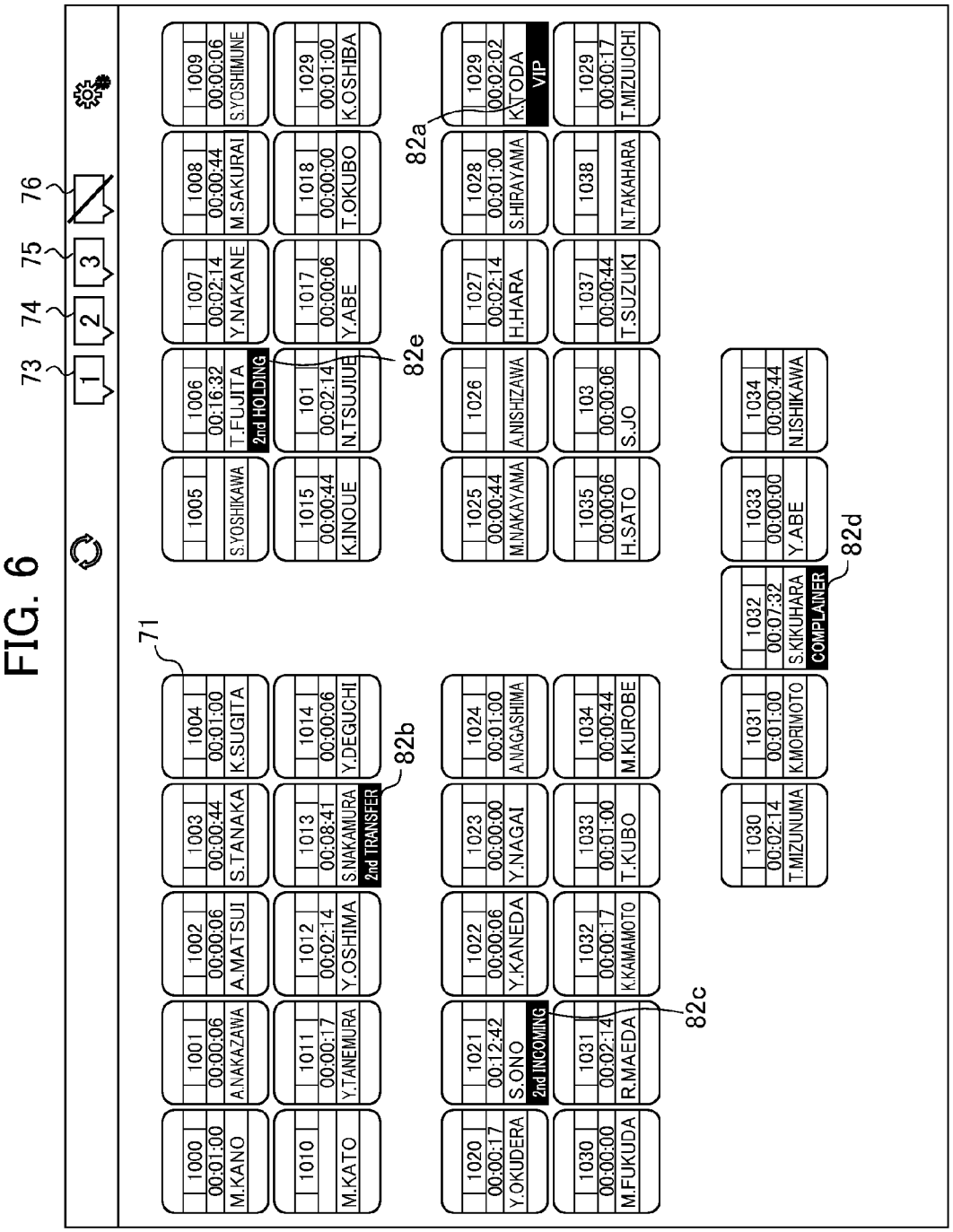
FIG. 6 is a view showing a second example of the second screen according to the embodiment.
Figure 7:
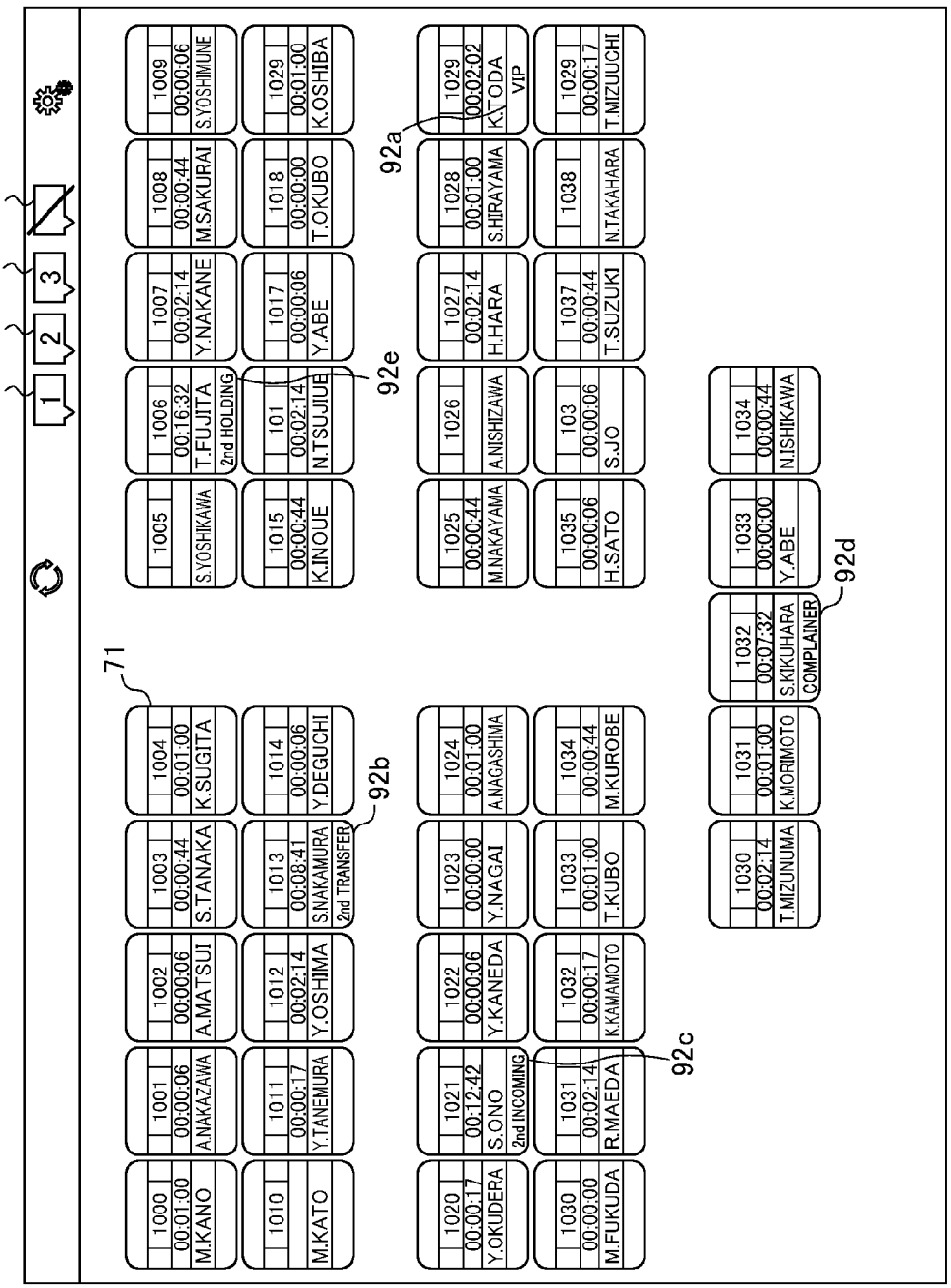
FIG. 7 is a view showing a third example of the second screen according to the embodiment.

By any of the display change buttons 73 to 75 being pressed, any of the display modes is selected among comments 72*a* to 72*e* of FIG. 5, comments 82*a* to 82*e* of FIG. 6, or comments 92*a* to 92*e* of FIG. 7. In addition, by the display clear button 76 being pressed, the comment display is cleared.

The comments 72*a* to 72*e* of FIG. 5 are displayed to be large by text balloons; however, the comments 82*a* to 82*e* of FIG. 6 fit within the seat images 71. In addition, the comments 92*a* to 92*e* of FIG. 7 are displayed within the seat images 71 as character information.

As stated above, the history management apparatus 1 according to the present embodiment generates historical data indicating response history of an agent relative to one call, from a plurality of fragment data sets. Then, since the history management apparatus 1 can display by specifying a call for which this historical data satisfies a predetermined condition, the manager can easily find a call requiring attention. As a result thereof, an improvement in the response quality of an agent is achieved.

This predetermined condition includes at least one among being a call specified by an established telephone number, being a call from the same telephone number in a predetermined time period for a multiple time, being a call for which transfer has been carried out a plurality of times, and being a call for which holding has been carried out a plurality of times. Therefore, for example, VIP, second time transfer, second time incoming telephone call, complainer, second time holding, etc. is specified, and the manager can easily find a call requiring attention. As a result thereof, an improvement in the response quality of an agent is achieved.

In addition, the historical data includes the duration or number of times of response states, respectively. Therefore, the manager can easily understand the response time from incoming response to disconnect, hold time and number of times, transfer number of times, etc. as indices of response quality, for example, and easily inspect and analyze whether the response to a call requiring attention was appropriate. As a result thereof, an improvement in the response quality of an agent is achieved.

In addition, the history management apparatus 1 list displays the historical data set of a specific call requiring attention in a display mode different from other historical data sets. Therefore, the manager can easily find a call requiring attention. As a result thereof, an improvement in the response quality of an agent is achieved.

In addition, the history management apparatus 1 performs comment display by associating with the seat of an agent corresponding to specific historical data requiring attention, among historical data related to a calls current continuing, as well as displaying a seating chart of a plurality of agents. Therefore, the manager can easily find a call requiring attention. As a result thereof, an improvement in the response quality of an agent is achieved.

In addition, as a refined search keys in the first screen (FIG. 4), the selection field 61 to agent selection field 67, and the receive button 70 are used. Therefore, a manager or the like can freely input search criteria by combining these search keys. In this case, the history management apparatus 1 can change the display contents of the list display field 69 in the first screen (FIG. 4), in response to the search criteria. In other words, for the manager, it is possible to change the display function of the history management apparatus 1, by a combination of refined search keys on the screen.

Although an embodiment of the present invention has been explained above, the present invention is not to be limited to the aforementioned embodiment. In addition, the effects described in the present embodiment are merely exemplifying the most preferred effects arising from the present invention, and the effects from the present invention are not to be limited to those described in the present embodiment.

The items included in the aforementioned historical data are an example, and the items displayed in the first screen (FIG. 4) can be changed as appropriate. For example, the transfer number of times, transfer time, etc. may be calculated and displayed.

In addition, the display mode of the historical data is not limited. For example, in the case of transfer having been made a plurality of times, a plurality of transfer destinations may be displayed, and a plurality of agents may be displayed. In addition, for example, in place of the incoming time, a time until disconnect, starting from incoming, including waiting time, OP answer, talking time+hold time, transfer and transfer destination talking time may be displayed as the response time.

The combination for refined search keys on the first screen (FIG. 4), and the function corresponding to this combination (display contents) are an example, any number of any types of search keys including the search keys illustrated can be employed, and the combination and corresponding relationship with function (display contents) may be arbitrary in this case.

The condition for extracting the specific historical data set is not limited to the aforementioned conditions a to e, and conditions may be set as appropriate by the manager based on the items contained in the historical data sets.

In addition, the display modes of comments displayed on the second screen (FIG. 5, FIG. 6 or FIG. 7) are not limited to the aforementioned three types.

The history management apparatus 1 may be carious information processing devices (computer) such as server equipment, a PC (Personal Computer) or a tablet terminal, in which each of the aforementioned functions are realized by software. In the case of being realized by software, the program constituting this software is installed in the information processing device. In addition, these programs may be distributed by recording onto removable media such as CD-ROM, or may be distributed by downloading to the information processing device via a network.

In addition, the functions of the history management device 1 may be distributed in part to CTI 3, another server, or the like. In this case, the processing load on the terminal of the manager having a display function is reduced.

What is claimed is:

1. A history management apparatus, comprising:
an acquisition part that acquires a plurality of fragment data sets, each of which indicates an action of a switchboard to a respective call and an execution time of the action;
a history generation part that generates, from the plurality of fragment data sets acquired by the acquisition part, a plurality of historical data sets, each of which indicates a history of response states of an agent to a respective call;
an extraction part that extracts a particular historical data set satisfying one or more predetermined conditions from the plurality of historical data sets;
an image generation part that generates data of a display image displaying information specifying a call corresponding to the particular historical data set extracted by the extraction part, along with information indicating the predetermined conditions; and
a display control part that causes the display image to be displayed on a display unit.

2. The history management apparatus according to claim 1, wherein the one or more predetermined conditions includes at least one among being a call specified by a predetermined telephone number, being a call from the same telephone number in a predetermined time period for a multiple time, being a call for which transfer has been carried out a plurality of times, and being a call for which holding has been carried out a plurality of times.

3. The history management apparatus according to claim 1, wherein the historical data set includes a duration and number of times of the response states, respectively, and
wherein the image generation part generates data of a display image further displaying the historical data set along with information specifying the call.

4. The history management apparatus according to claim 3, wherein the image generation part generates data of a display image displaying the historical data set extracted by the extraction part in a display mode that differs from other historical data sets, when list displaying the historical data set of each of a plurality of calls.

5. The history management apparatus according to claim 1, wherein the image generation part generates data of a display image displaying a seating chart of a plurality of agents, and displaying information indicating the predetermined condition, by associating with a seat of an agent corresponding to the historical data set extracted by the extraction part, among historical data sets related to currently ongoing calls.

6. A history management method executed by a computer including an acquisition part, a history generation part, an extraction part, an image generation part, and a display control part, the method comprising the steps of:
the acquisition part acquiring a plurality of fragment data sets, each of which indicates an action of a switchboard to a call and an execution time of the action;
the history generation part generating, from the plurality of fragment data sets acquired by the acquisition part, a plurality of historical data sets, each of which indicates a history of response states of an agent to a respective call;
the extraction part extracting a particular historical data set satisfying one or more predetermined conditions from the plurality of historical data sets;

the image generation part generating data of a display image displaying information specifying a call corresponding to the particular historical data set extracted in the extracting step, along with information indicating the predetermined conditions; and the display control part displaying the display image on a display unit.

7. A non-transitory computer-readable medium encoded with a history management program for enabling a computer to execute the steps of:

acquiring a plurality of fragment data sets, each of which indicates an action of a switchboard to a call and an execution time of the action;

generating, from the plurality of fragment data sets acquired by the acquisition part, a plurality of historical data sets, each of which indicates a history of response states of an agent to a respective call;

extracting a particular historical data set satisfying one or more predetermined conditions from the plurality of historical data sets;

generating data of a display image displaying information specifying a call corresponding to the particular historical data set extracted in the extracting step, along with information indicating the predetermined conditions; and displaying the display image on a display unit.

* * * * *